INVENTORS:
ROBERT M. LOCKERD
MARK W. SMITH
RAY E. COOPER
GEORGE E. GOODE
Harold E. Meier
ATTORNEY Jan. 5, 1971 R. M. LOCKERD ET AL 3,553,693

MODULAR ELECTRONICS COMMUNICATION SYSTEM

Filed Dec. 14, 1967 4 Sheets-Sheet 2

United States Patent Office 3,553,693

Patented Jan. 5, 1971

3,553,693

MODULAR ELECTRONICS COMMUNICATION SYSTEM

Robert M. Lockerd and Mark W. Smith, Dallas, and Ray E. Cooper and George E. Goode, Richardson, Tex., assignors to Texas Instruments Incorporated, Dallas, Tex., a corporation of Delaware Filed Dec. 14, 1967, Ser. No. 690,638
Int. Cl. H01q *3/26*; H04b *7/00*
U.S. Cl. 343—100 14 Claims

ABSTRACT OF THE DISCLOSURE

A communication system including a plurality of radiating elements formed into an antenna array for transmitting and receiving communication frequency signals and employing a central processor to generate the transmitted signals and process the received frequencies through a manifold arrangement. Each radiating element connects to the manifold through a module made up of integrated microwave circuitry including a mixer coupled to a local oscillator and a phase shifter coupled to a beam steering computer. By means of the beam steering computer the antenna can be made to scan various preselected areas.

This invention relates to a communication system involving solid state microwave modules, and more particularly to a modular electronic communication system having a multi-element phased array antenna.

While this invention is immediately advantageous in connection with construction and operation of satellite and airborne communication systems, it has application to other communication systems such as those used for mobile ground applications and microwave transmission.

In comparison to conventional communication systems, a modular electronics system provides the advantages of less weight per watt of effective radiating power, non-inertial electronic beam steering (where required), and increased system reliability because of the use of integrated circuits and distributed-function, building block construction. These advantages are of particular importance for satellite communication and airborne communication systems. However, they are also important to ground based systems especially those requiring high reliability.

Satellite and airborne communication systems have been faced with the problems of minimizing weight and increasing reliability while generating high power microwave energy. Other major problems of conventional mobile communication systems have been concerned with auxiliary equipment such as rotary joints, servo motors for the antennas, and the like. Restrictions imposed by such components on reliability exist in the most modern of transistorized systems produced for mobile service. Further, the magnetrons for transmitting, and klystrons for local oscillator service all have been found to restrict the reliability of the system.

In accordance with the present invention, there is provided an improved communication system in which solid state circuitry is so constructed and arranged as to be capable of overcoming the major obstacle heretofore encountered in the development of such a system, namely, the generation of high power microwave energy. This problem is overcome by the use of solid state functional electronic blocks or modules, so constructed as to operate as a modular antenna array which may be responsive to beam steering control and which may be operated at an adequate power level. The electronic blocks may be designed to operate at almost any communications frequencies. At the same time, such construction lends itself to a lightweight multi-element antenna array using electronic beam scanning thereby eliminating wave guides, rotary joints, motors, synchros, gears, and other servo components normally essential to a moving antenna communication system. As a result, a substantial reduction in total volume and weight over known or existing systems is achieved. This is accompanied by a substantial increase in the reliability of the system.

Another advantage of the phase array integrated circuit communication system is the ability to restrict the transmit and receive beam width thereby increasing the antenna efficiency. In conventional satellite or aircraft communication systems, the beam width must be made sufficiently large to completely cover a desired section plus an area outside the desired section necessitated by tolerances in the satellite's or aircraft's attitude control system. Because of the much wider beam width in the conventional communication system, a transmitter must have a greater transmitter power to achieve effective communication.

Beam pointing and control in a phased array is accomplished by the setting of phase shifters in series with each radiating element. A beam scanning computer calculates the necessary phase for each element in order to collimate the beam at some position in space and generates an individualized digital code for each element. Typically, the scan computer is a digital device and the variable phase shifter is either a digital device or a digitally controlled analog device. Phased array antennas are formed by radiating elements arranged in any desired pattern, for example, a planar array of rows and columns. In order to control the direction of the antenna beam, an individualized digital code is provided to the phase shifter for each of the radiating elements in the antenna array. In operation, the digital computer generates individual codes for each radiating element depending on its position in the array. This code is applied to the phase shifter to impart a predetermined amount of phase shift to the signal received or transmitted from the element. If each phase shifting code imparts a particular degree of phase shift, the entire beam can be pointed in any desired direction. The phase shifting code may be applied to all the elements simultaneously or on a sequential basis. In the sequential mode, one phase shifter at a time would be updated, while all other shifters would remain unchanged.

Each radiating element in the antenna array is part of an antenna module with individual power generation and phase control circuitry. The use of solid state modules, together with microwave transistors, permits operation in the X-band and higher. Production of transmitting and receiving power at the desired frequency involves the use of frequency multipliers and up-converters of integrated circuit construction. Thus, each transmit module includes the necessary circuitry for amplifying relatively low IF energy applied simultaneously to all of the modules, and multiplying the frequency to a higher frequency for transmission from the transmit radiating elements. Each receive module includes circuitry for processing one or more high frequency signals received by the receive radiating elements to produce low frequency IF signals, which are also preamplified. In addition, each module includes phase shifting means for the transmitted or received energy so that the beams to or from the fixed antenna array can be electronically scanned.

The phased array integrated circuit communication system of this invention as set forth in the appended claims includes a multiple radiating element antenna coupled to a signal processor through amplification and phase shifting devices. For X-band frequency operation, a local oscillator output frequency is multiplied and mixed with an IF signal for both the transmit and receive operation.

A more complete understanding of the invention and its advantages will be apparent from the specification and claims and from the accompanying drawings illustrative of the invention.

Referring to the drawings.

Figure 1:
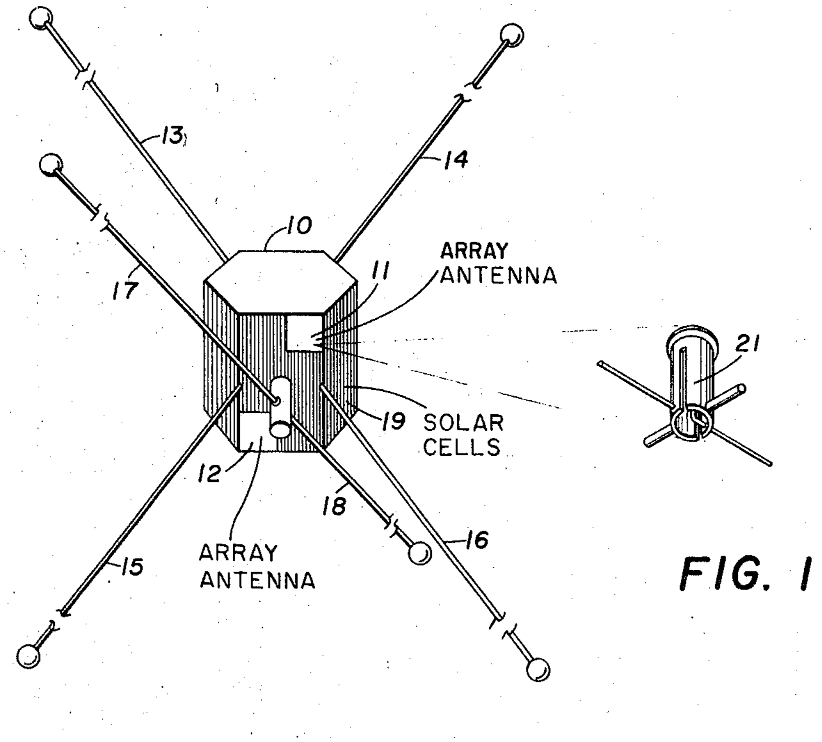
FIG. 1 is a pictorial of a satellite mounted modular electronic communication system employing independent transmit and receive antenna arrays.

This invention will be described as it is employed as a satellite communication system contained within a satellite 10, referring to FIG. 1, having a phased array transmitting antenna 11 and a similar phased array receiving antenna 12. A plurality of booms 13–18 provide a means for instructing the satellite 10 to maintain a predetermined position relative to the earth. This orientation is such that the antenna arrays 11 and 12 are always facing toward the earth's surface. Electrical power to operate the communication system of the present invention is provided by means of solar cells 19 covering all outer surfaces of the satellite 10 except for areas covered by the antennas 11 and 12. Solar cell power supplies are now well known in the art and additional description is not deemed necessary.

By using separate transmitting and receive antennas 11 and 12 separated by several feet, greater isolation between transmit and receive modes is possible. Each of the antennas 11 and 12 comprises an array of individual radiating building blocks terminating in a radiating element, such as the crossed dipole 21. Other radiating element configurations that can be used include the slotted dipole configuration, the orthogonal slot configuration, and various open ended wave guides. The antennas 11 and 12 consist of no less than two radiating elements with the maximum number limited only by practical considerations. An antenna array for a 3-degree beam width with 0.75λ element-to-element spacing requires approximately 550 radiating elements.

Figure 2:
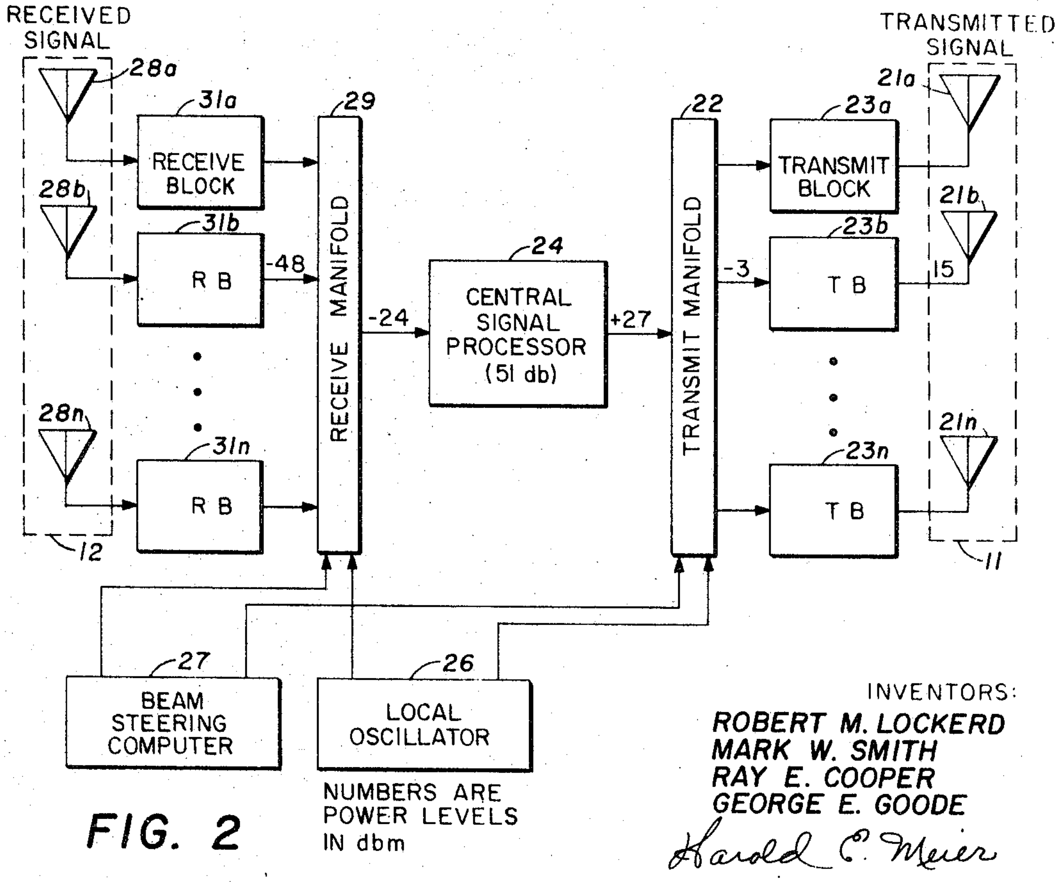
FIG. 2 is a basic block diagram of a complete phased array integrated circuit communication system with independent transmit and receive antennas.

Each radiating element 21*a*, 21*b* . . . 21*n* of the antenna 11, referring to FIG. 2, is coupled to a manifold 22 through a modular electronic transmitting building block 23*a*, 23*b* . . . 23*n*, respectively. A central processor 24 composed of a limiter and power amplification section provides a signal to the manifold 22 for distribution to the radiating elements of the antenna 11. For the system shown, the central processor 24 could be either a frequency translation repeater or demod-remod system, either of which to be a limiting or linear system. The relative amplitude and phase of the signal supplied to each of the radiating elements are controlled to obtain the desired radiation pattern from the combined action of all the elements in the antenna 11. A local oscillator 26 coupled to the manifold 22 provides power to the transmitting building blocks for use in the frequency conversion process where required. A beam steering computer 27, also coupled to the manifold 22, provides the phasing information for beam steering purposes.

A system similar to that described in the preceding paragraph is also provided to process communication signals received by the antenna 12 made up of radiating elements 28*a*, 28*b* . . . 28*n*. Each signal received by elements of the antenna 12 is transmitted to a manifold 29 through a modular electronic receiving block 31*a*, 31*b* . . . 31*n*. The beam steering computer 27 again provides phasing information to the signals received by the antenna 12 prior to processing by the central signal processor 24. Where required, the local oscillator 26, coupled to the manifold 29, converts the transmitted frequency into an IF signal for handling by the central signal processor 24. Thus, the basic modular electronic communication system contains six major elements: the receive antenna array 12, the central processor 24, the transmit antenna array 11, the manifolds 22 and 29, the beam steering computer 27, and the local oscillator 26.

Figures 3, 4, 9:
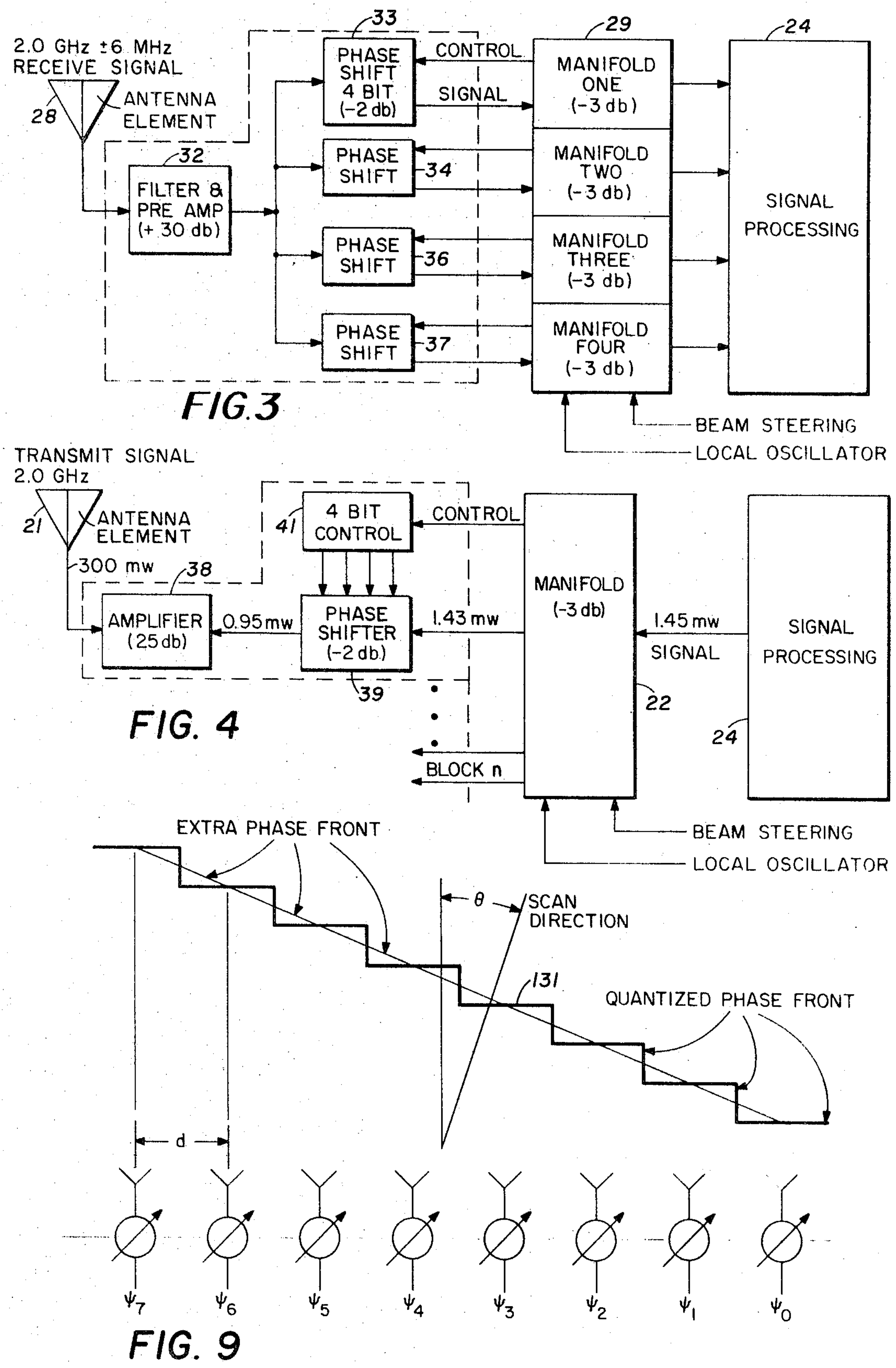
FIG. 3 is a block diagram of a multiple signal low frequency modular electronics receiving system.
FIG. 4 is a block diagram of a low frequency modular electronics transmitting system.
FIG. 9 is an illustration of beam scanning.

Referring to FIG. 3, there is shown a simple low frequency (2.0 gHz.) receiving module including a filter and preamplifier 32 and four phase shifters 33, 34, 36, and 37, one for each of four possible signals received by a radiating element. The radiating element 28 connects to the input of the pre-amplifier and filter 32. Each of the phase networks 33, 34, 36, and 37 receives a control signal from and transmits a signal to an associated section of the manifold 29. The various sections of the manifold 29 in turn transmit and receive signals from the signal processor 24.

In an exemplary operation of a multiple phase shifter and manifold receive system, the four receive signals from the element 28 are coupled to each phase shifter 33, 34, 36 and 37. A given phase displacement is applied to each signal in each phase shifter in accordance with the control code connected thereto. The signals from all the phase shifters coupled to one manifold are then summed in such a manner that only one of the received signals will be coherent. The remaining three will be non-coherent resulting in an unintelligent signal (noise), which is rejected by the central processor 24. Each phase shifter and manifold operates in a similar manner to coherently add one received signal and non-coherently add the other three.

A typical 2-gHz. preamplifier includes thin film resistors and capacitors, and several amplification stages employing chip transistors in a microstrip circuit on a ceramic substrate. Such a device will provide low noise amplification of the signal received at the radiating element 28. Phase shifting with a 4-bit phase shifter, such as phase shifters 33, 34, 36 and 37, is obtained by switching two PIN diodes, one at each end of a quarter wave section of transmission line. Typically, a shifter uses two parallel sets of diodes on each quarter wave section. Thus, two bits of phase shift are obtained by one section of line. With a receiving system as shown in FIG. 3, various amounts of phase shift can be applied to a signal received by the antenna element 28.

For a low frequency communication system, a transmit building block for one radiating element is shown in FIG. 4 and includes an amplifier 38 coupled to a 4-bit phase shifter 39. An antenna element 21 is coupled to the amplifier 38 and a control network 41 connects to the phase shifter 39. A control code from the beam steering computer 27 is coupled to the control network 41 through the manifold 22. The phase shifter 39 receives a signal through the manifold 22 from the signal processor 24. The amplifier 38 and the phase shifter 39 are again microstrip circuits with discrete components on a ceramic substrate as described with respect to the receive building block of FIG. 3.

Figure 5:
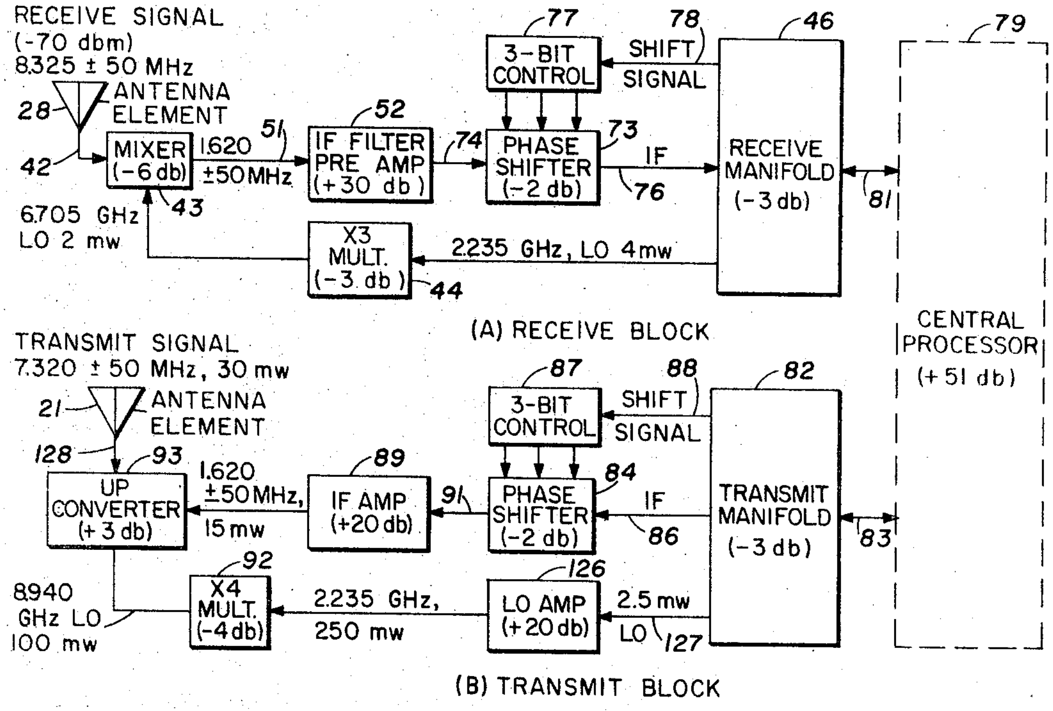
FIG. 5 is a block diagram of an X-band modular electronics receive and transmit communication system.

While the receive and transmit building blocks of a low frequency system are relatively simple, including only an amplifier and a phase shifter, the same building blocks for and X-band communication system requires additional components as shown in FIG. 5. An antenna element 28 receives a circularly polarized wave of about 8.3 gHz. and converts it into the input of an unbalanced strip line 42 leading to a mixer 43. Insofar as possible, the antenna element 28 rejects a transmit signal emitting from the antenna element 21 to provide a limited amount of isolation. As discussed previously, a crossed dipole is one of many configurations for the antenna element 28 and provides good isolation between transmit and receive signals. Typically, the element 28 will be mounted on a 1 x 1 inch block face followed by a tapered coax balun.

Figure 6:
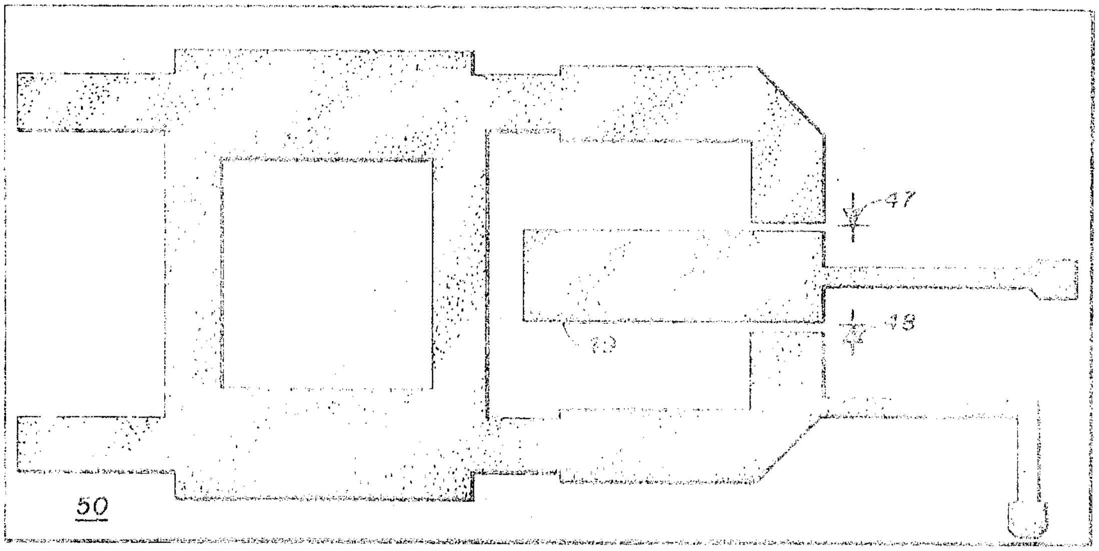
FIG. 6 is an integrated circuit mixer employing a surface-oriented diode wafer and ceramic substrate.

Conversion of the RF received signal into an IF processing signal takes place in the mixer 43 by means of a signal from a multiplier 44 connected to the output of a 2.235 mHz. local oscillator through a receive manifold 46. The mixer 43 utilizes a Schottky-barrier, GaAs diode of the type described in the U.S. Pat. 3,388,000, issued to Warren P. Waters. Metal semiconductor diodes, which are known in the art as Schottky barriers, are commonly used in high frequency circuits such as, for example, the mixer 43. The Schottky barrier of the above U.S. patent is fabricated on a semiconductor substrate to conform to the total integrated circuit technique of a modular electronics communication system. An example of an X-band mixer circuit is shown in FIG. 6; it is a thin film circuit using metallization on a ceramic substrate 50. The Schottky barrier mixer diodes 47 and 48 are mounted as chips on either side of an open one quarter wavelength stub 49 providing a short circuit at the input signal frequency. A complete description of a microwave integrated circuit mixer is given in the U.S. Pat. 3.416,042 issued to Phillip R. Thomas et al.

The fundamental operation of a mixer 43 is to convert a microwave frequency to a lower frequency with a minimum of added noise. The conversion for optimum operation should be with minimum loss. Generally speaking, the received microwave signal and a signal from a local oscillator are applied to a semiconductor junction from which the difference in frequency or an IF output is extracted. To optimize the noise level for the receiver system, both the signal to noise ratio of the mixer and the conversion loss in the mixer must be as low as possible.

The frequency multiplier 44 can be of a varactor type with a single idler circuit. In the design of an integrated circuit 3× multiplier, careful attention must be given to harmonic noise problems arising from spurious emission from the multiplier. For example, if the 3× multiplier produces a 4× component, the 4× component would mix with the transmitted signal to produce noise at the IF frequency. However, a 3× multiplier circuit using varactor diodes should not directly contain a fourth harmonic if designed with a single idler circuit at twice the input frequency.

Output signals at an IF frequency appear on channel 51 and are applied from the mixer 43 to an IF filter and preamplifier 52. The IF preamplifier is a three or four stage hybrid structure to provide, for example, a 30-db gain with a 6-db noise figure. Filtering of the IF signal on channel 51 is required at the input of the preamplifier to reduce amplifier loading due to the noise outside the IF band. The principal noise source will be the transmit signal which is converted by the mixer 43. Since this frequency is about one and one-half octaves below the IF signal, a multipole band pass microstrip filter should achieve at least 40-db of attenuation. A completely monolithic IF preamplifier circuit can be constructed using thin film resistors, capacitors, and inductors and epitaxial transistors on a high resistivity silicon substrate.

Figure 7:
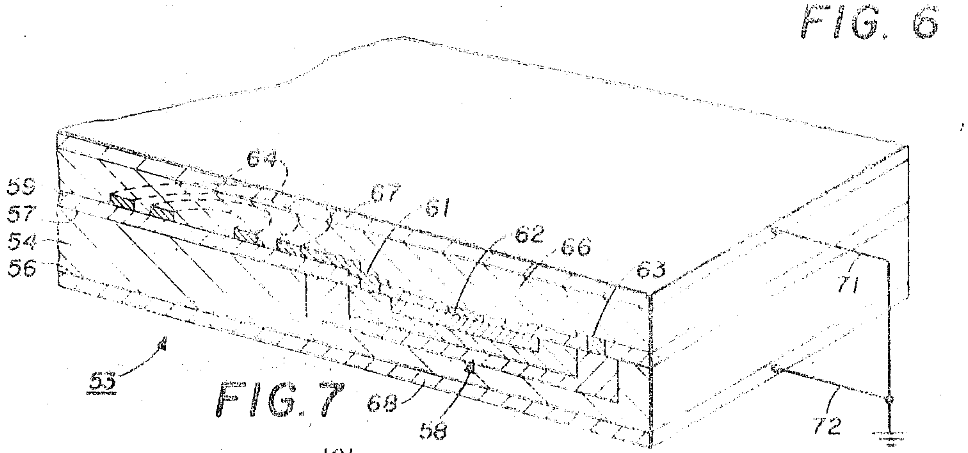
FIG. 7 illustrates a video amplifier construction for the IF preamplifier of FIG. 5.

FIG. 7 illustrates an integrated circuit 53 of a construction suitable for the IF amplifier 52 of FIG. 5. The circuit 53 is comprised of a substrate 54 of single crystal, high resistivity silicon or other semi-insulating or high resistance semiconductor material having first and second surfaces 56 and 57. The resistance required between the surfaces 56 and 57 will vary with the frequency at which the circuit is operated, the lower the frequency the greater the resistance required. However, for high frequency applications, high resistivity semiconductor material is adequate. The components for the IF amplifier are formed at the surface of the semiconductor substrate 54 using any conventional technique. For example, in addition to epitaxial techniques, a transistor 58 may be formed in the surface by sequentially diffusing N-type, P-type and N-type regions into the surface 57 of the substrate through openings etched in an oxide film 59. The circuit may also include interconnecting strip conductors such as 61, 62, and 63 which may be placed directly on the high resistivity substrate 54 or on the oxide film 59. The conductors may also form inductors such as indicated by the dotted outline at 64.

An insulating layer 66, such as glass, is deposited over and inherently bonded to the portion of the second surface of the substrate 54 which is exposed, and to the components of the circuit. The insulating layer 66 is therefore integral with the substrate. Metallized films 67 and 68 are inherently bonded to the insulating layer 66 and to the first side 56 of the substrate. When the metallized films 67 and 68 are connected to ground, as represented by the conductors 71 and 72, the entire integrated circuit is disposed between two closely spaced ground planes. The ground planes and the circuit are interconnected so as to provide a rugged, sealed package. For high frequency transmission lines, the dielectric properties between the circuit components and each of the ground planes may be made approximately equal for improved performance.

A phase shift network 73 receives the amplified IF signal by way of a channel 74 and delivers output signals of IF frequency by way of channel 76 to the receive manifold 46. A beam steering or phase control voltage is applied to a control network 77 from the manifold 46 by way of channel 78 and produces a 3-bit control signal to the phase shifter 73.

The control network 77 is a register which accepts a one-out-of-eight phase step command through the manifold 46 and stores it until another command is received. The register is composed of three flip-flops and an input logic gate, all in low power integrated circuit form, similar to Texas Instruments Series 54L Logic Modules.

The output signal of the control register of the network 77 drives the phase shifter 73, which may be implemented as 3-series shunt-loaded microstrip transmission line quarter wave sections. Phase shifting is obtained by switching two PIN diodes, one at each end of a quarter wave section transmission line. A PIN diode is primarily capacitive under reverse bias and resistive under forward bias and provides a low power loss phase shifting mechanism. The three phase shift sections provide phase shifts in 45-degree steps from 0 to 360 degrees. That is, a 45-degree section, a 90-degree section, and a 180-degree section is provided in the phase shift network 73.

Output signals at an IF frequency appear on channel 76 and are applied through the manifold 46 for processing in a central processor 79 by means of a channel 81. A distributive manifold for a modular microwave system made up of a large number of building block modules, such as the one shown coupled to the manifold 46 and including the radiating element 28, is described in the copending U.S. application of Troy D. Fuchser described in the U.S. Pat. 3,438,029 issued to Troy D. Fuchser et al. As described in the referenced patent, the manifold 46 is a submanifold of a complete distributive manifold system. In addition to the module associated with the radiating element 28, as shown in FIG. 5, the manifold 46 would be coupled to three other radiating elements of the antenna array 12 of FIG. 1. One quarter of the total number of said submanifolds are coupled to a main manifold which in turn are coupled to a four-way divider. In FIG. 5, the channel 81 is intended to represent the main manifold and four-way divider system coupling the radiating element 28 to the central processor 79.

For the transmit section of a modular electronics communication system, an IF frequency signal is transmitted from the central processor 79 through a transmit manifold 82 by means of a channel 83 to a phase shift network 84 by means of a channel 86. Again, the channel 83 is intended to represent a complete manifold system for dividing a transmit signal into a plurality of transmit signals to each radiating element of the antenna array 11. A beam steering or phase control code is applied to a control network 87 from the manifold 82 by way of a channel 88 and supplies a 3-bit control signal to the phase shift network 84. The phase shift network 84 and the control network 87 are similar in construction and operation to the corresponding phase shift network 73 and control network 77 of the received module as described previously.

An IF signal from the phase shift network 84 is coupled to an IF amplifier 89 by means of a channel 91. The IF amplifier 89 is similar to the preamplifier 52 described with reference to FIG. 7, except that it will be designed to operate at higher power levels.

The upward frequency conversion process performed on the output of the IF amplifier 89 is basically the same as the downward shifting done in the mixer 43, except that a lower side band up-converter is employed for the actual translation process. A 4× multiplier 92 supplies the carrier frequency to an up-converter 93. The 4× multiplier 92 is similar in construction to the 3× varactor type multiplier 44 in the receive module.

Figure 8:
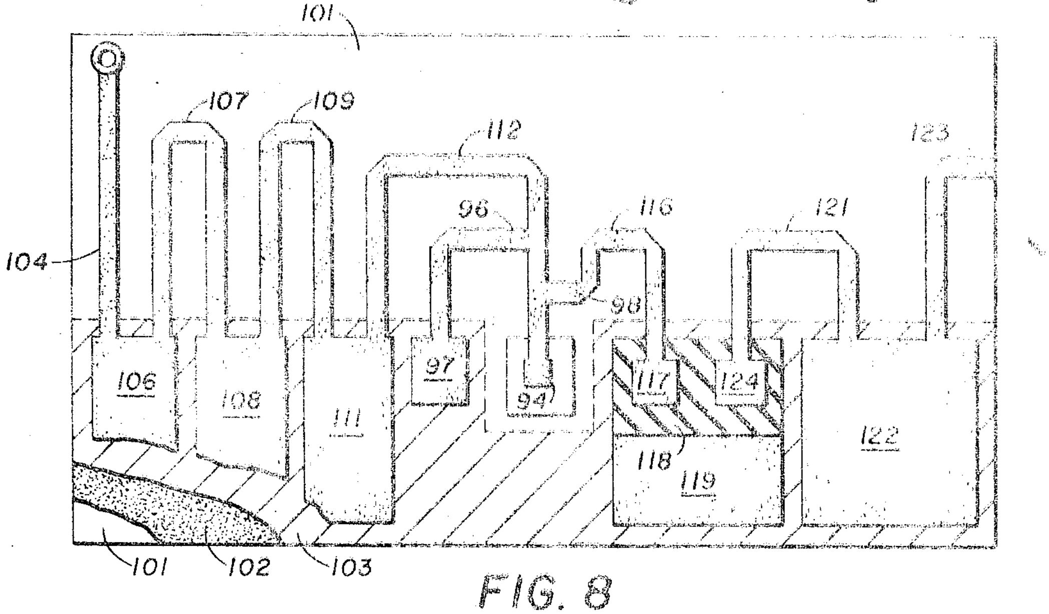
FIG. 8 is a top view of an integrated circuit embodiment of a multiplier of FIG. 5.

A 4× multiplier circuit is shown in FIG. 8 and employs a varactor diode 94 operating as a quadrupler with idlers at second and third harmonics. More particularly, a tuned circuit 96 and 97 may be considered to be resonant at the second harmonic and the tuned circuit 98 and 94 at the third harmonic. The varactor diode 94 and the strip line transmission circuits forming inductance and capacitance are formed on a semiconductor substrate. The substrate 101 has about one-half of its area covered by a highly conductive surface layer 102. The layer 102 is then covered by a thin dielectric layer 103 so that layer 102 serves as a common plate for all but two condensors in the multiplier.

The input L section is formed by the strip transmission line 104 which extends over the thick dielectric portion of the substrate 101 to the plate 106 of the input capacitor. The capacitor 106 overlays the relatively thin dielectric layer 103 to form a condensor with the common conductive layer 102. A loop 107 forms an inductance over the thick dielectric layer and leads to a capacitor plate 108 over the thin dielectric layer. Similarly, a loop 109 leads to the capacitor plate 111. A transmission line filter system will thus be characterized by long thin transmission lines over a thick dielectric section to provide primarily inductance characteristics. Wide transmission line sections overlaying thin high dielectric layers form zones in the transmission line system primarily capacitive in nature. A loop 112 extends from plate 111 over the thick dielectric to the juncture with a loop 96 which leads to a capacitor plate 97. Loop 112 also leads to one terminal of the varactor diode 94. A strip extending from the juncture 98 and loop 116 then leads to a capacitor plate 117. The capacitor plate 117 is positioned on top of a conductive layer 118 which overlays one-half of a condensor plate 119. Condensor plate 124 similarly overlays the plate 119. The transmission line loop 121 then extends to the output capacitance plate 122 with the matching conductance 123 extending from the plate 122. The plate 119 is capacitively coupled to the capacitor plates 117 and 124 and to the high conductive layer 102. The process of forming an integrated circuit multiplier is thoroughly described in the U.S. Pat. 3,386,092 of Tom M. Hyltin.

The 4× multiplier 92 quadruples the 2.235 gHz. output of a local oscillator as amplified by a LO amplifier 126 coupled to the transmit manifold 82 by means of a channel 127. The up-converter 93 is a varactor type similar in some respects to the varactor multiplier circuits 44 and 92. It is of the lower side band type rather than the more conventional upper side band type to reduce harmonic noise production in the receiver IF band pass and reduce the factor by which the local oscillator must be multiplied prior to the conversion process. The converted IF signal from the amplifier 89 is then transmitted as an RF frequency signal from the radiating element 21 coupled to the up-converter 93 by means of an unbalanced strip line 128.

By way of example, the operation of the system of FIG. 5 is such that the 8.325 gHz.±50 mHz. circularly polarized wave applied to the antenna element 28 will be converted to a 1.620 gHz.±50 mHz. signal in the mixer 43. The frequency conversion function by the 3× multiplier 44 changes the 2.235 gHz. local oscillator signal into a 6.705 gHz. signal coupled to the mixer 43. The input power level to the multiplier 44 is 4 mw., to provide the required 2 mw. input to the mixer 43. The IF signal of 1.620 gHz.±50 mHz. is amplified in the IF filter preamplifier 52 having three or more stages of transistor amplification to generate a gain of 30 db.

Again, by way of example, the transmit section emits a circularly polarized 7.320 gHz.±50 mHz. signal from the radiating element 21 from the up-converter 93. The up-converter 93 receives a 1.620 gHz.±50 mHz., 15 mw. signal from the IF amplifier 89 and an 8.940 gHz., 100 mw. signal from the 4× multiplier 92. The LO amplifier 126 has a gain of 20 db at 2.235 gHz., with an output power of 250 mw., while the IF amplifier 89 has a gain of 20 db. Thus, the power generation chain of the transmit section consists of one stage of amplification at 2.235 gHz. followed by a 4X varactor multiplier with an output at 8.940 gHz.

As explained previously, phased array antennas such as 11 and 12 are formed of radiating elements arranged in any desired geometry, for example, triangular spacing. They may be planar or non-planar (conformal). In order to control the phase of the antenna transmit or receive beam, phase control codes are provided for each of the radiating elements in the antenna array. These codes are generated by the beam steering computer 27 such as shown in FIG. 2. Thus, the beam pointing and control in a phased array is accomplished by the phase setting of a phase shift network in series with each radiating element such as networks 73 and 84 of FIG. 5. A beam scanning computer calculates the necessary phase for each element in order to collimate the beam at some position in space. The scan computer can be a digital device and the variable phase shift networks either a digital device or a digitally controlled analog device. Because of their digital nature. phase shift networks may be classified as follows.

| Phase shifter: | Minimum discrete phase shifter, degrees |
|---|---|
| 1-bit | 180 |
| 2-bit | 90 |
| 3-bit | 45 |
| 4-bit | 22.5 |
| 5-bit | 11.25 |

Thus, the larger number of "bits" available to control a phase shifter, the more accurately the array beam may be positioned. It is believed that a 3-bit phase shift network will provide sufficient accuracy for beam steering for the system of this invention.

Referring to FIG. 9, there is illustrated the relationship between beam pointing angle and the required phase shift network setting which is given by:

$$\psi_n = -\frac{d}{\lambda}(2\pi)\sin\theta \quad (1)$$

where:

$\psi_n$=phase shift setting (radians)
$d$=spacing between radiators
$\lambda$=wavelength (same units as $d$)
$\theta$=scan angle.

For the radiating elements shown in the lower portion of FIG. 9, each separated a distance $d$, the phase shifter setting for a scan angle of $\theta$ is as follows:

$$\psi_0=0$$

$$\psi_1=-\frac{d}{\lambda}(2\pi)\sin\theta$$

$$\psi_2=2\psi_1$$

$$\psi_3=3\psi_1$$

$$\psi_n=n\psi_1$$

Modern electronically scanned arrays using digital means for controlling the phase of each antenna element frequently use binary devices, such as diodes, for the actual phase control. The two state characteristic of these devices naturally leads to binary phase quantization. In FIG. 9, the actual quantized phase front for each of the seven elements shown is given by the stair-step curve 131, For a control network such as 77 and 87 of FIG. 5 the minimum step size, Q, for the curve 131 is given by:

$$Q=2\pi/2^n \text{ radians} \qquad (2)$$

where $n$=the number of control bits. Increasing the number of control bits reduces the quantization error at the expense of increased complexity, insertion loss, driving power, cost, and weight of the overall system. Therefore, there is usually some tradeoff between the accuracy with which the array beam may be positioned and the quantization error.

Radar phased array antenna beam steering, which is similar in many respects to the beam steering required in the system of this invention, is adequately described in the literature. For example, the work of Merrill I. Skolnik entitled "Introduction to Radar Systems," McGraw-Hill, contains a section on phased array antennas and beam steering. A phased array antenna scan control system is also described in the U.S. Pat. 3,345,631 issued to Leo A. Chamberlain, Jr.

Figure 10:
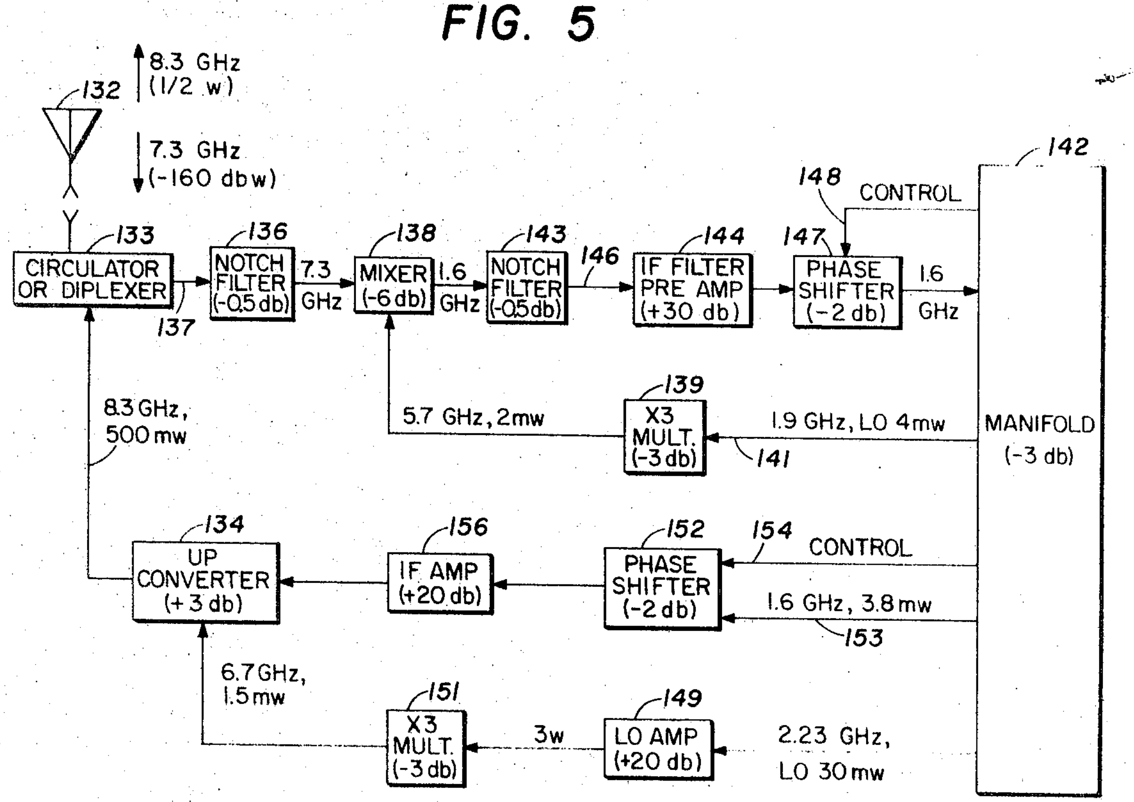
FIG. 10 is a block diagram of an X-band modular electronic communications system using a single phased array antenna for transmit and receive.

Referring to FIG. 10, there is shown a duplexed operation employing a single antenna 132 for the received and transmitted signals which are separated by a circulator 133, sometimes known as a diplexer. The circulator 133 is a three-port device that has the property that a wave incident in port one is coupled into port two only, a wave incident in port two is coupled into port three only, and so on. Ideal circulators are matched devices, that is, all ports except one terminate in matched loads, the input impedance of the remaining port is equal to the characteristic impedance of its input line, and hence presents a matched load. H. J. Carlin in an article entitled "Principles of Gyrator Networks," Polytech Institute, Brooklyn, vol. 4, 1955, describes how a lossless, matched, nonreciprocal three-port microwafe junction is an ideal three port circulator. A practical realization of a three-port circulator involves a symmetrical Y-junction of three identical "strip-line" type transmission lines with an axial magnetized ferrite rod or disk at the center of the Y-junction. Thus, if an 8.3 gHz. signal transmitted to port one of the circulator 133 is incident in one leg of the Y-junction, it is coupled to the antenna element 132 through only the second leg of the junction. The 7.3 gHz. signal received by the antenna element 132 will be incident in the second leg of the Y-junction and coupled to only the third leg. Typical characteristics that can be obtained from a circulator are insertion loss of less than 1 db, and isolation between the transmit and receive signal of from 30 to 40 db.

Additional separation between the 8.3 gHz., 500 mw. transmit signal output of an up-converter 134 from the received signal is performed by a notch filter 136 coupled to the circulator 133 by means of a channel 137. The notch filter 136 is a microstrip configuration providing on the order of 80 to 130 db isolation between the transmit signal and the 7.3 gHz. receive signal. A conversion of the 7.3 gHz. signal from the filter 136 to a 1.6 gHz. signal of IF frequency is performed in a mixer 138 coupled to receive a 5.7 gHz., 2 mw. signal from a 3× multiplier 139. The 3× multiplier 139 receives a 1.9 gHz. local oscillator signal on channel 141 through a manifold 142.

Additional filtering of the IF signal from the mixer 138 is performed in a notch filter 143 coupled to an IF filter and preamplifier 144 by means of a channel 146. A phase shift network 147 receiving control signals over a channel 148 couples the 1.6 gHz. signal to a central processor (not shown) through the manifold 142.

The transmit channel of the system of FIG. 10 is similar to the transmit channel of the system of FIG. 5. In addition to the up-converter 134, it includes a local oscillator amplifier 149 for power amplification of a 2.235 gHz. local oscillator signal and a 3× multiplier 151 for changing the local oscillator signal into a 6.7 gHz. signal connected to the up-converter 134. A phase shift network 152 applies the appropriate phasing information to a 1.6 gHz. signal on channel 153 in accordance with control information on channel 154. An IF amplifier 156 couples the transmit signal from the phase shifter network 152 to the up-converter 134 wherein a conversion process takes place to the 8.3 gHz. transmit signal.

Again, a module containing the components shown in FIG. 10 is required for each radiating element of the antenna array 132. The operation and construction of the various components of FIG. 10 have been described previously with respect to FIG. 5, except for the notch filters 136 and 143, and the diplexer 133.

In addition to the use of modular electronics technology to satellite communication systems, there are several other areas for its application; the most appealing of which is the implementation of skin-mounted conformal arrays for aircraft. A modular electronic communication system, capable of high antenna gains and coupled to a beam steering computer, allows relative small tactical aircraft to communicate freely through a satellite system. Presently, only large, equipment filled aircraft are capable of communicating through such a satellite system. Possibilities exist in this context for the implementation of a combined navigation and communication system employing exclusively satellite terminals. The modular electronics array also is compatible with implementation as an electronically adaptive system or a retrodirective system which permits automatic tracking of satellites from aircraft terminals.

The frequency flexibility of a modular electronics communication system with its high speed, inertialess beam steering also lends itself for adaptation to other applications. For example, spacecraft systems with a high gain, steerable antenna are envisioned as becoming important as data rates and communication distances increase. These same characteristics, combined with the reliability and relative ruggedness of an integrated circuit system, make it equally suitable for portable mobile or shipboard applications.

Another area contemplated as within the scope of the present invention includes a system for generating several radiation patterns from one antenna array simultaneously. This, for example, permits the simultaneous, narrow-beam tracking of several satellites by one earth based array. A multibeam function may be achieved in several ways. The simplest of which is to use designated sections of the antenna array for each beam. Another approach would be to use multiple phase shifters and manifolds in the transmit section in a manner similar to the receive section of FIG. 3. With this approach, the entire antenna array is used for each transmit beam. The phase shift networks for each group of radiating elements would be independently controlled by the beam steering computer.

While several embodiments of the invention, together with modifications thereof, have been described in detail herein and shown in the accompanying drawings, it will be evident that various further modifications are possible in the arrangement and construction of its components without departing from the scope of the invention.

What is claimed is:

1. A modular communication system comprising:

an antenna array of transmitting elements, an antenna array of receiving elements, a transmit module for each transmitting element of said antenna array for transmitting information signals independent of signals received at said receive array, said module including phase shift means for shifting the phase of a transmitted signal, power amplification means for increasing the power of said transmitted signal, and a transmit channel coupling said phase shift means and said power amplification means to said element to convey said phase shifted transmitted signal of increased power to said element, a receive module for each receive element of said antenna array for receiving information signals independent of signals transmitted from the transmit array, said module including amplifier means for increasing the power of a received signal, phase shift means for selecting the phase of the received signal independent of the phase shift of the transmitted signal, and a receive channel coupled to said phase shift means for conveying a received signal from said element, and a signal processor for generating said transmitted signal and processing said received signals coupled to the module of each transmitting and receiving element of said antenna arrays.

2. A modular communication system comprising:

an antenna array including a plurality of transmitting and receiving elements, a transmit module coupled to each transmitting element of said antenna array for transmitting information signals independent of signals received at the antenna array, said module including phase shift means for shifting the phase of a transmitted signal and a transmit channel between an input terminal and said element for excitation of said element with a transmitted signal, said channel including a frequency converter means and a power amplifier, a receive module coupled to each receive element of said antenna array for receiving information signals independent of signals transmitted from the antenna array, said module including phase shift means for selecting the phase of the received signal independent of the phase shift of the transmitted signal and a receiving channel coupled to said phase shift means and said element for conveying a received signal, said channel including a mixer and filter-preamplifier, and a signal processor for generating said transmitted signal and processing said received signal coupled to the module of each transmitting and receiving element of said antenna array.

3. A communication system as set forth in claim 2 wherein said transmit elements are physically separated from said receive elements to provide isolation between said transmitted signal and said received signal.

4. A communication system as set forth in claim 2 wherein said transmit module further includes a control network connected to said phase shift means to control the phase of the transmitted signal, and said receive module further includes a control network connected to said phase shift means to control the phase of said received signal independent of the phase shift of the transmitted signal.

5. A communication system as set forth in claim 4 including a beam steering computer coupled to each module of said system to generate individualized control voltages to each control network in accordance with the position of the elements in said antenna array.

6. A communication system having a central processor for generating a transmitted signal and processing a received signal comprising:

an antenna array of a plurality of transmitting and receiving elements, a transmit module for each transmitting element of said antenna array for transmitting information signals independent of signals received at the antenna array, said module including phase shift means for shifting the phase of a transmitted signal generated by said signal processor, power amplification means for increasing the power of said transmitted signal, a frequency multiplier for changing the frequency of a local oscillator signal, and an up-converter connected to said power amplification means and said multiplier for converting the frequency of the transmitted signal coupled to said element to an RF signal, and a receiving module for each receive element of said antenna array for receiving information signals independent of signals transmitted from the antenna array, said module including a frequency multiplier for changing the frequency of a local oscillator signal, a mixer connected to said multiplier and the receiving element for producing an IF signal, filter and amplification means for filtering and power amplification of the IF signal, and phase shifting means for shifting the phase of the received signal independent of the phase shift of the transmitted signal and coupled to the said signal processor.

7. A communication system as set forth in claim 6 wherein in said receive module further includes a local oscillator amplifier for amplification of the local oscillator signal prior to multiplication.

8. A communication system as set forth in claim 7 wherein said transmit module further includes a control network connected to said phase shift means to control the phase of the transmitted signal, and said receive module further includes a control network connected to said phase shift means to control the phase of said received signal independent of the transmitted signal.

9. A communication system as set forth in claim 8 wherein the setting of the transmit and receive phase shift means is given by:

$$\psi_n = -n\frac{d}{\lambda}(2\pi)\sin\theta$$

where $\theta$ is the scan angle.

10. A communication system having a central processor for generating a transmitted signal and processing a received signal comprising:

an antenna array of a plurality of transmitting/receiving elements, and a transmit-receive module for each element of said antenna array, said module including phase shift means for shifting the phase of a transmitted signal generated by said signal processor independent of signals received at the antenna array, power amplification means for increasing the power of said transmitted signal, separating means for separating a transmitted signal from a received signal, a transmit channel coupling said phase shift means and said power amplification means to convey said phase shifted transmitted signal of increased power to said element, said module also including phase shift means for selecting the phase of the received signal processed by the central processor independent of the transmitted signal and a receive channel coupling said separating means to said phase shift means for conveying a received signal to said central processor, said receive channel including filter-preamplifier means.

11. A communication system as set forth in claim 10 wherein said transmit-receive module includes a first frequency multiplier in said transmit channel and a second frequency multiplier in said receive channel for changing the frequency of a local oscillator signal.

12. A communication system as set forth in claim 11 wherein said separating means includes a circulator and said transmit-receive module further includes an up-converter for converting the frequency of the transmitted signal, said up-converter connected to said power amplification means of said transmit channel and said first multiplier.

13. A communication system as set forth in claim 10 wherein said transmit-receive module includes a mixer in said receive channel, said mixer coupled to said second multiplier and said separating means.

14. A communication system as set forth in claim 13 wherein said transmit-receive module includes a first filter between said separating means and said mixer and a second filter in the receive channel following said mixer.

References Cited

UNITED STATES PATENTS

| | | | |
|---|---|---|---|
| 3,234,551 | 2/1966 | Giger | 343—100(SAT) |
| 3,037,185 | 5/1962 | Dewitz | 343—100.6 |
| 3,238,527 | 3/1966 | Vogt | 343—100.6 |
| 3,345,631 | 10/1967 | Chamberlin | 343—100.6 |
| 3,355,735 | 11/1967 | Chait | 343—854 |
| 3,386,092 | 5/1968 | Hyltin | 343—100.6 |

RICHARD A. FARLEY, Primary Examiner
H. C. WAMSLEY, Assistant Examiner